United States Patent [19]

Gembinski

[11] Patent Number: 4,572,856

[45] Date of Patent: Feb. 25, 1986

[54] COMPOSITE MOLDED ARTICLE AND PROCESS USING SELF-POSITIONING LAMINATED STIFFENER

[75] Inventor: John C. Gembinski, Dover, N.H.

[73] Assignee: Ex-Cell-O Corporation, Troy, Mich.

[21] Appl. No.: 668,602

[22] Filed: Nov. 5, 1984

[51] Int. Cl.$^4$ ............................ B32B 1/04; B32B 3/02
[52] U.S. Cl. ........................................ 428/71; 156/79; 264/46.5; 264/46.7; 428/76; 428/159; 428/174; 428/309.9; 428/316.6
[58] Field of Search ................ 156/79; 264/46.5, 46.7; 428/71, 76, 158–160, 174, 179, 182, 309.9, 316.6

[56] References Cited

U.S. PATENT DOCUMENTS

| | | | |
|---|---|---|---|
| 1,766,471 | 6/1930 | Van Dusen | 264/46.5 |
| 3,472,728 | 10/1969 | Hitch | 264/46.7 |
| 3,834,962 | 9/1974 | Strumbos | 264/46.7 |
| 3,960,999 | 6/1976 | Massie | 264/46.7 |
| 4,339,487 | 7/1982 | Mullet | 428/71 |
| 4,351,870 | 9/1982 | English, Jr. | 428/174 |
| 4,471,020 | 9/1984 | McCarthy | 428/309.9 |

*Primary Examiner*—William J. Van Balen
*Attorney, Agent, or Firm*—Edward J. Timmer

[57] ABSTRACT

A stiffener insert is incorporated into a molded composite article such as an automobile dashboard by inserting the stiffener insert between a pre-formed plastisol skin forming opposed mold walls for receiving an intermediate polyurethane foam layer therebetween and partially compressing a porous, resilient layer such as an open celled reticulated foam layer on opposite sides of the stiffener insert to an extent sufficient to exert a spring-like holding force to self-center the insert between the mold walls and yet insufficient to cause readout of the partially compressed porous insert layer through the outer plastisol skin on the final molded article. The partially compressed, porous, resilient layer on the stiffener insert permits flow of polyurethane foam therethrough to fill the mold cavity and is impregnated with the polyurethane foam to securely bond the stiffener insert in the composite article. The spring-like bias exerted by the partially compressed porous, resilient layers on the stiffener insert maintains its position in the mold cavity during flow of polyurethane foam therethrough.

26 Claims, 6 Drawing Figures

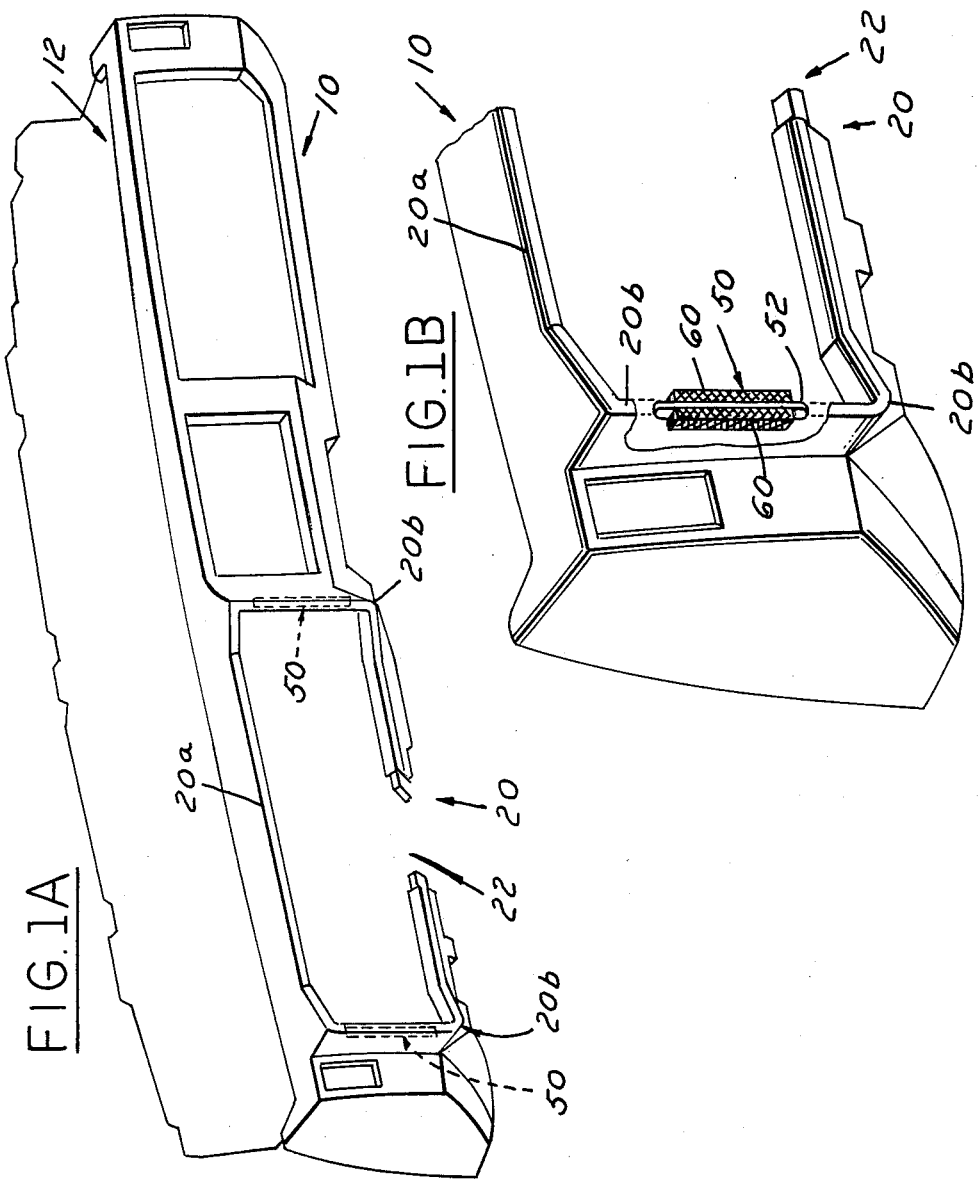

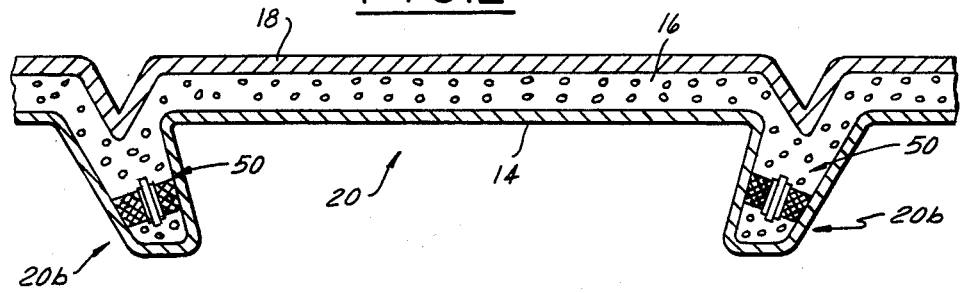
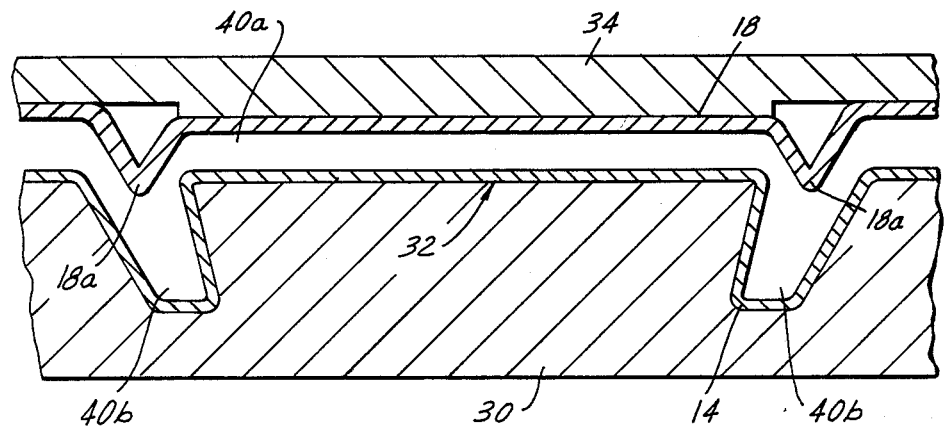
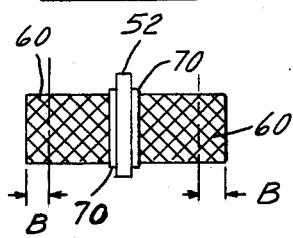
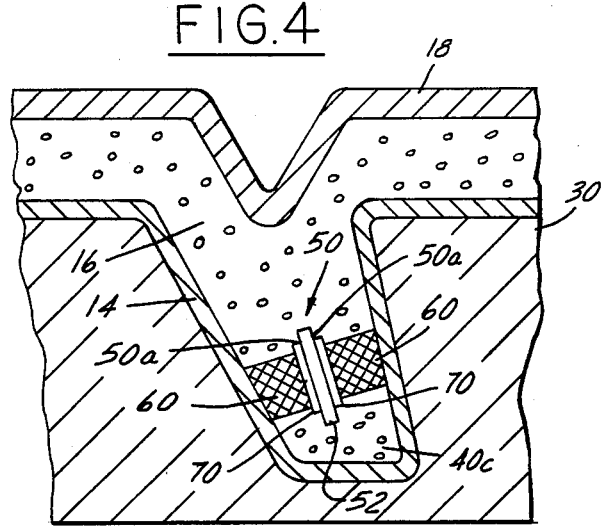

COMPOSITE MOLDED ARTICLE AND PROCESS USING SELF-POSITIONING LAMINATED STIFFENER

FIELD OF THE INVENTION

The present invention relates to molded articles and, in particular, to composite molded articles including an intermediate foam component between outer foam-impermeable layers and including a special stiffener insert in the foam component to enhance stiffness of the composite article and to methods for molding with the special stiffener insert being self-positioning in the mold during foaming and being sufficiently pervious to liquid and foam flow to allow mold filling without harmful voids.

BACKGROUND OF THE INVENTION

Today's automobile dashboards represent complex composite molded articles to which this invention is especially applicable, although not limited. Automobile dashboards typically include an outer plastisol skin (plasticized vinyl), intermediate foam layer and inner rigid or semi-rigid plastic support insert. One process for producing such articles includes providing a mold cavity having the outer configuration of the dashboard, laying the plastisol outer skin in the mold cavity so that it will conform thereto, pouring a layer of liquid polyurethane foam onto the skin in the mold and then placing the plastic insert into position in the mold cavity above the liquid polyurethane foam. In this process, the plastic insert is carried on the mold lid which is swung closed over the mold cavity. Once the mold is closed, the liquid polyurethane is caused to foam in the space between the outer skin and inner plastic insert and form the composite dashboard described.

In the manufacture of dashboards having a so-called instrument cluster, there is provided a cluster enclosure having vertically oriented cluster enclosure members projecting sharply from the main body of the dashboard and which have been found to exhibit too much flexibility in a direction transverse to the vertical axis. This lack of stiffness in the vertically-oriented cluster members is attributable to the impracticability or inability to extend the portions of the rigid or semi-rigid plastic support insert into the mold cavity areas forming the vertical cluster enclosure members to provide stiffness. That is, as a result of the projecting angles of the enclosure member cavities relative to the plane of the mold cavity and as a result of the requirement that the plastic insert be loaded into the mold cavity on the mold lid, the portions of the mold cavity defining the vertical cluster enclosure members are not accessible to extensions that might otherwise be provided on the plastic insert for stiffening and are considered die locked from this standpoint.

A means for increasing the stiffness of cluster enclosure members on such automobile dashboards compatible with existing manufacturing methods is thus needed.

A resilient composite urethane structure is disclosed in the Knox U.S. Pat. No. 3,153,853. The patented structure includes an elastomeric solid non-cellular non-planar polyurethane reinforcement to increase load-bearing characteristics.

British patent specification No. 720,549 describes a method for making a molded sponge or cellular rubber article wherein a film of unvulcanized rubber is bonded to a metal insert prior to molding and during molding the rubber introduced into the mold is expanded and vulcanized and unites with and produces vulcanization of the film to enhance bonding of the insert in the molded rubber article.

The Van Dusen U.S. Pat. No. 1,766,471 discloses a laminated material comprising a metal sheet having hard vulcanized cellular rubber mats on opposite slides thereof that may be used in lieu of wood in structural applications with an additional metal sheet overlying one or both of the rubber mats. U.S. Pat. No. 3,472,728 to Hitch and U.S. Pat. No. 3,834,962 to Strumbos also disclose reinforced foam structural members.

SUMMARY OF THE INVENTION

The invention contemplates a method for molding a composite article wherein a stiffener insert is suspended in a mold cavity by inserting the insert between opposed mold walls preferably covered by plastisol and partially compressing a porous, resilient layer on opposite sides of the insert to a sufficient extent to exert a spring-like force or bias to hold the insert in position and yet allow flow of flowable material such as liquid or foam through the partially compressed layer. The invention is especially useful for suspending a stiffener insert in a die locked cluster enclosure member cavity during the automobile dashboard molding process described hereinabove. The spring-like locating force exerted by the partially compressed, porous, resilient insert layer is controlled to be sufficient for insert location and retention and yet insufficient to cause readout of the insert through the outer plastisol layer; i.e., the partially compressed porous insert layer now molded into the polyurethane foam is not readily visible through the plastisol layer.

The invention also contemplates a composite article of the type having an intermediate or inner layer such as a foam or porous layer and outer less porous layers with a stiffener insert captured in the intermediate layer. The stiffener insert includes a partially compressed, porous, resilient layer extending therefrom into contact with the outer layers and impregnated with the intermediate layer by virtue of the insert being in place in the mold cavity when the intermediate layer is formed between the outer layers. The invention is especially useful for enhancing the stiffness of vertical cluster enclosure members on automobile dashboards without the insert being visible through the outer decorative plastisol skin or layer.

The invention also contemplates a stiffener insert for use in the molding method and composite article of the preceding paragraphs characterized by having a porous, resilient layer on opposite sides of the insert compressible to a sufficient extent during insertion between the opposed mold walls to exert a spring-like holding force to keep the insert in position during the molding operation.

In a typical working embodiment of the invention for molding composite automobile dashboards with one or more cluster enclosure members, the method of the invention includes lining a suitably configured mold cavity, including a die-locked cluster cavity thereof, with a thin pre-formed plastisol skin and suspending a stiffener insert having a porous, resilient layer, such as reticulated foam, on the sides thereof between the opposed plastisol skin portions in the die-locked cluster enclosure member cavity. Suspension of the stiffener insert is effected by inserting the insert into the die-locked cavity and partially compressing the porous resilient layer to an extent sufficient to hold the insert in place by spring-like action and yet insufficient to cause readout through the plastisol skin in the final molded article. Polyurethane foam is then caused to flow throughout the mold cavity, including into the cluster enclosure member cavity through the partially compressed insert layer, to form the foam layer between the outer plastisol layer and inner rigid or semi-rigid plastic insert carried on the closed mold lid. The polyurethane foam impregnates or permeates the partially compressed insert layer and thereby incorporates the insert into the foam layer between the outer plastisol layer defining the dashboard cluster enclosure member without adversely affecting foam flow into the die-locked cluster cavity. The stiffener insert typically includes an elongated wooden member with reticulated foam bonded to sides thereof by adhesive, such as double-sided adhesive tape, the adhesive of which is dried prior to insertion of the stiffener insert in the cluster enclosure member cavity. The permeating material need not be limited to foam as any low pressure liquids which subsequently set or cure could also be used.

BRIEF DESCRIPTION OF THE DRAWINGS

FIG. 1A is a partial perspective of a composite molded automobile dashboard having an instrument cluster enclosure and FIG. 1B is an enlarged perspective partially broken away of the instrument cluster enclosure.

FIG. 2 is a fragmentary cross-sectional view of the dashboard in the area of the instrument cluster enclosure with the stiffener inserts in the intermediate foam layer.

FIG. 3 is a cross-sectional view of the molding apparatus employed to mold dashboards of the type shown in FIG. 1 prior to insertion of the stiffener insert.

FIG. 4 is a fragmentary, enlarged cross-section of a cluster enclosure member cavity of FIG. 2 showing the insert in position with the intermediate foam layer formed therearound.

FIG. 5 is an end view of the insert of FIG. 1.

DESCRIPTION OF PREFERRED EMBODIMENTS

FIGS. 1A and B illustrate a composite molded automobile dashboard to which the present invention is applicable but not limited. The dashboard 10 includes a main body 12 comprising an outer decorative plastisol layer 14, intermediate polyurethane foam layer 16 and an inner rigid plastic support insert 18 (FIG. 2). The main body is highly contoured in certain areas such as the area forming instrument cluster enclosure 20 which includes rib-like portions projecting sharply from the main body to form for example the cluster enclosure area 22 for the dashboard speedometer, warning lights and other instruments. The rib-like portions include a generally horizontal cluster member 20a and a pair of generally vertical cluster members 20b. As mentioned hereinabove, the vertical cluster members have in some cases been perceived to exhibit too much flexibility or softness in the direction transverse to the vertical axis. By means of the stiffener insert 50 and mold process described hereinbelow, the stiffness of the vertically-oriented cluster members 20b can be significantly enhanced.

In FIG. 3, the molding apparatus for making the subject automobile dashboard 10 includes a female die 30 with a die cavity 32 having a contour corresponding to that of the dashboard to be molded. The molding apparatus includes a mold lid 34 which is closeable onto the female die 30 and which carries the rigid plastic support insert 18 which may be made of styrene malic anhydride, NORYL, ABS, metal, etc. It is apparent that the plastic support insert is received in the die cavity 32 and is spaced therefrom. The actual molding cavity 40 for the polyurethane foam layer is formed by lining the female mold cavity 32 with the thin, pre-formed plastisol skin 14 such as vinyl plastisol, vinyl drysol, vinyl acrilinitryl butadyene styrene, and other well known plastics forming the outer decorative layer of the dashboard, prior to inserting the plastic support insert 18, the mold cavity 40 being formed by the space between the plastic support insert and plastisol skin after the plastic support insert is received in the female die cavity.

The molding cavity 40 includes in FIG. 3 a pair of cluster enclosure member cavities 40b projecting sharply from the main mold cavity 40a. The plastic support insert 18 includes rib-like projections or appendages 18a which extend only slightly into the cluster enclosure member cavities 40b as shown because the cavities 40b are die locked. That is, due to the particular angle of projection of the cluster enclosure member cavities and due to the need for closing the mold lid onto the female die with the plastic support insert attached on the lid, the support insert appendages 18a cannot extend into the cavities 40b a substantial extent to provide support against forces transverse to the vertical axis of the cluster enclosure members.

As a result, the cluster enclosure member cavities 40b include opposed, facing mold walls 40c formed by the plastisol lining or shell 14 which is doubled back or reversed back upon itself in the cavities 40b as shown during lining.

FIG. 4 illustrates the stiffener insert 50 suspended in one of the cluster enclosure member cavities 40b. Another stiffener insert of like construction is of course similarly suspended in the other cavity 40b.

The stiffener insert 50 includes a central elongated stiffener member 52 which may be wood, plastic, metal or any suitable material having a higher modulus than the transverse cross section of the plastisol skin and foam forming the final molded vertically oriented cluster enclosure member 20b. A birch wood stiffener member has proved satisfactory. The longitudinal axis of the support member 52 is aligned generally parallel with the vertical or longitudinal axis of the cavities 40b. The stiffener member 52 preferably has rounded corners as shown to avoid sharp corners in the final molded article.

Bonded or otherwise attached to the opposite lateral sides 50a of the stiffener member 52 is an open-celled reticulated foam layer 60 available commercially as Scott SF (10 porous/inch at $\frac{1}{8}$ inch thickness) from Scott Foam Company. Typically, the reticulated foam layer 60 is bonded to the stiffener member 52 by double-sided adhesive tape 70 having one side adhered to one lateral side of the stiffener member 50 and the other side to the reticulated foam layer 60. Before insertion of the stiffener insert in the cavities 40b, the insert is heated at a temperature and for a time sufficient to dry the adhesive tape 70 bonded to the reticulated foam layer 60 for purposes to be explained hereinbelow.

Although open-celled reticulated foam is employed for insert foam layer 60, other materials may be used including any open or porous, resilient fibrous or cellular mat, pad or layer which allows adequate liquid and foam flow therethrough and which is partially compressible to exert a spring-like bias against the mold walls formed by plastisol skin 14 in the cavities 40b to hold the insert in place. The insert foam layer 60 may be molded integrally with the stiffener member 52 to provide a one-piece stiffener insert.

Suspension of the stiffener insert 50 in the cluster enclosure member cavities 40b is effected by inserting the insert between the opposed mold walls formed by the doubled-back plastisol skin 14 such that the foam layers 60 are partially compresse sufficiently to exert a spring-like bias or holding force against the mold walls to hold the insert in place therebetween and yet insufficient to cause readout of the foam layer 60 through the thin plastisol skin 14 in the final molded automobile dashboard. That is, the foam layer 60 should not be visible to the ordinary eye through the plastisol skin of the molded dashboard. This important and delicate balancing of the spring-like holding force exerted by the partially compressed foam layer 60 is achieved typically by adjusting the thickness of the foam layer 60 for a particular type of foam material and mold wall spacing. For example, as shown in FIG. 5, a preselected partial compression B in the thickness of the foam layers 60 is empirically determined to provide the necessary spring-like insert holding force or bias without readout through the molded dashboard. For the reticulated Scott SF layer 60 described hereinabove, a partial thickness compression of about 15–30% has been found satisfactory for holding and centering the stiffener insert between the mold walls of cavities 40b without readout through the plastisol skin 14.

Although the stiffener insert 50 is shown more or less self-centered between the mold walls forming cavity 40b, it is apparent that off-center positioning can be effected by varying the thickness of the foam layer 60 bonded on the opposite sides of the stiffener member 52. Also wall thickness of the plastisol 14 may be varied.

As already mentioned hereinabove, the stiffener insert 50 is heated to set and dry the adhesive bonding the reticulated foam layer 60 to the stiffener member 52. This step is taken to insure that when squeezed (substantially compressed) during manual handling the reticulated foam layer 60 will not remain or stick in the substantially compressed condition but rather will spring back to its original porous, resilient condition. Setting and drying of the adhesive in effect prevents the crushed foam layer from sticking to the adhesive.

Of course, it is important that during insertion of the stiffener insert 50 between the mold walls of cavities 40b the foam layer 60 will be only partially compressed so as to continue to allow liquid and foam flow therethrough to portions 40c of cavity 40b behind the stiffener insert (on the side of the insert opposite from the plastic support insert 18).

In the molding operation, the die cavity 32 is lined with the pre-formed plastisol shell or skin 14, liquid polyurethane foam is poured onto the plastisol shell 14 and the mold lid is swung closed to position the plastic support insert 18 in the molding cavity 40 spaced from the plastisol shell 14. The closed mold is then heated to a temperature and for a time to cause the liquid polyurethane to foam, flow and cure between the plastisol shell 14 and support insert 18, bonding them together into a molded composite dashboard. As a result of the porosity of the foam layer 60 of the stiffener insert 50, the polyurethane liquid and foam can flow therethrough throughout the cluster cavities 40b including into portions 40c behind the insert without substantial void formation and impregnates the insert foam layers 60, bonding the stiffener insert soundly in the polyurethane foam layer 16 of the dashboard. During foam flow, the spring-like bias or force exerted by the partially compressed insert foam layers 60 holds the stiffener insert in place between the mold walls during foam flow against the flow action of the foam and also against the tendency of the stiffener insert to float in the foam. Other materials which could be used in lieu of polyurethane in the molding process are reaction injection molded (RIM) type nylon, styrene, polyester and olefin as well as others.

While certain specific and preferred embodiments of the invention have been described in detail hereinabove, those skilled in the art will recognize that various modifications and changes can be made therein within the scope of the appended claims which are intended to include equivalents of such embodiments.

I claim:

1. A composite article comprising an intermediate layer and an outer layer on opposite sides of the intermediate layer and further comprising stiffener means in the intermediate layer between the outer layers, said stiffener means including a stiffener member having a partially compressed, porous, resilient layer extending therefrom into contact with a respective outer layer and impregnated with said intermediate layer by virtue of said stiffener means being in place between the outer layers when the intermediate layer is formed therebetween.

2. The article of claim 1 wherein the intermediate layer is porous and the outer layers are less porous layers.

3. The article of claim 2 wherein the intermediate layer is polyurethane foam and the outer layers are plastic film.

4. The article of claim 3 wherein the plastic film layers are vinyl plastisol.

5. The article of claim 1 wherein the stiffener member is made of wood.

6. The article of claim 1 wherein the stiffener member is made of plastic.

7. The article of claim 1 wherein the stiffener member is made of metal.

8. The article of claim 1 wherein the partially compressed, porous, resilient layer on the stiffener member is reticulated foam or fiber mat.

9. The article of claim 1 wherein the partially compressed, porous, resilient layer is attached to the stiffener member by adhesive means.

10. The article of claim 9 wherein the adhesive means is double-sided tape having one side adhered to the stiffener member and the other side to the partially compressed porous, resilient layer.

11. The article of claim 1 wherein the stiffener means comprises a molded plastic stiffener member and a partially compressed, porous, resilient layer molded integrally thereto.

12. The article of claim 1 wherein the article comprises an automobile component.

13. A molded composite article having an outer decorative layer, an intermediate foam layer and an inner support layer forming a main body wherein an appendage of the article extends away from the main body to such an extent that the outer decorative layer faces itself rather than the support layer with the foam layer between the facing outer layer, said article further having a stiffener means in the foam layer of the appendage between the facing outer decorative layer, said stiffener means including a stiffener member having opposite sides facing and spaced from the facing outer decorative layer and a partially compressed, porous, resilient layer attached to said sides extending therefrom into contact with the outer decorative layer and impregnated with the foam layer by virtue of said stiffener means being in place between the facing outer decorative layer when the foam layer is formed therebetween.

14. The article of claim 13 which is an automobile dashboard wherein the appendage is a cluster enclosure member on the dashboard.

15. The article of claim 13 wherein the foam layer is polyurethane foam, the outer decorative layer is plastisol and the inner support layer is a plastic insert.

16. The article of claim 15 wherein the stiffener member is wood and the partially compressed, porous, resilient layer is reticulated foam.

17. A method for making a composite article with a stiffener insert therein, comprising (a) forming opposite mold walls of a layer of a first material, (b) suspending a stiffener insert with a porous, resilient layer on opposite sides thereof between the opposite mold walls by inserting the stiffener between said mold walls and partially compressing the porous, resilient layer a sufficient amount to exert a spring-like holding force against said mold walls to hold the stiffener insert in place, and (c) flowing a second material between said mold walls and through the porous, partially compressed resilient stiffener layer and incorporating the stiffener insert into said second material, said stiffener insert maintaining its suspended position during flow of said second material as a result of said spring-like holding force.

18. The method of claim 17 wherein said opposite mold walls are formed by lining a mold cavity with a pre-formed skin of plastic material.

19. The method of claim 17 wherein said second material is introduced as a liquid polyurethane and then foamed between said mold walls.

20. The method of claim 17 wherein the second material is a RIM type nylon, styrene, polyester or olefin.

21. In a molding process for making a highly contoured composite article wherein a plastic support insert is received in a highly contoured mold cavity and wherein portions of the mold cavity form an appendage cavity with facing mold walls and which is die locked relative to said support insert so as to preclude portions of said support insert from extending substantially thereinto, the steps of lining the mold cavity with a pre-formed skin of foam-impermeable material, suspending a stiffener insert between portions of the skin facing one another in said appendage cavity by partially compressing the porous, resilient layer on said opposite sides a sufficient extent to exert a spring-like holding force against the facing skin portions to hold the stiffener insert in place, and introducing a foam material into said mold cavity with the foam material flowing through the porous, partially compressed resilient stiffener layer to fill the appendage cavity and impregnate said stiffener layer to incorporate said stiffener insert into the foam material, said stiffener insert maintaining its suspended position during foam flow as a result of said spring-like holding force.

22. In a molding process for making an automobile dashboard wherein a plastic support insert carried on a mold lid is received in a mold cavity having the contour of the dashboard including a cluster enclosure member cavity which is die locked relative to the plastic support insert so as to preclude portions of the plastic support insert from extending substantially thereinto, the steps of lining the mold cavity with a pre-formed plastisol skin, suspending a stiffener insert in the mold cavity cluster enclosure member cavity between the plastisol skin by partially compressing a porous, resilient layer on opposite sides of said stiffener insert a sufficient extent to exert a spring-like holding force against the plastisol skin to hold the stiffener insert in place and insufficient to cause readout of the stiffener insert through said plastisol skin on the molded article, and introducing a polyurethane foam into said mold cavity with the foam flowing through the partially compressed porous, resilient stiffener layer to fill the cluster enclosure member cavity and impregnate said stiffener layer to incorporate said stiffener insert into the foam, said stiffener insert maintaining its suspended position during foam flow as a result of said spring-like holding force.

23. A stiffener insert for incorporation into a composite molded article comprising an elongated stiffener member having a porous, resilient layer on sides thereof compressible to a sufficient extent to exert a spring-like bias to hold the insert in position between facing mold walls and permeative to flowable material.

24. The insert of claim 22 wherein the porous, resilient layer is reticulated foam.

25. The insert of claim 23 wherein the reticulated foam is bonded to the sides of the insert by adhesive.

26. A method for suspending an insert between the walls of a mold cavity comprising inserting the insert between the mold walls and partially compressing a porous, resilient layer on sides of the insert to a sufficient extent to exert a spring-like bias against said walls to hold the insert in position and yet allow flow of molding material through the partially compressed layer.

* * * * *